Jan. 10, 1950        J. J. PESQUEIRA        2,494,196

LATHE

Filed Nov. 13, 1945        6 Sheets-Sheet 1

INVENTOR
Juventino J. Pesqueira
BY
ATTORNEY

Fig. 4

Jan. 10, 1950  J. J. PESQUEIRA  2,494,196
LATHE
Filed Nov. 13, 1945  6 Sheets-Sheet 6

INVENTOR
Juventino J. Pesqueira
BY
J. B. Felshin
ATTORNEY

Patented Jan. 10, 1950

2,494,196

UNITED STATES PATENT OFFICE 2,494,196

LATHE

Juventino Jose Pesqueira, New York, N. Y., assignor to Morey Machinery Co., Inc., New York, N. Y., a corporation Application November 13, 1945, Serial No. 627,985

11 Claims. (Cl. 82—2)

This invention relates to lathes. It is particularly directed to a lathe for turning a piece of stock, such as a railroad axle or like article, simultaneously lengthwise on opposite sides of the median line relative to the length of said piece of stock.

An object of this invention is to provide a lathe of the character described comprising a pair of tool holders, a pair of interconnected feed cylinders between said tool holders, each including a piston attached to one of said holders, and means for simultaneously moving the pistons in opposite directions for moving the tool holders and turning the stock symmetrically about a median point lengthwise of the stock.

Yet a further object of this invention is to provide a lathe of the character described comprising a headstock, a tailstock, a quill rotatably and slidably mounted in the tailstock, a rotary spindle in the headstock having driving contact with one end of a work piece, and a means on the quill adapted to move into contact with the opposite end of said work piece, and rotate therewith, and means interconnecting the feed cylinders with the quill, so arranged that the connected feed cylinders are moved half the distance of said quill.

In turning articles such as railroad axles, which must be turned symmetrically on opposite sides of the middle of the said article, the turning tools must be disposed equal distances away from the median of said article. In accordance with the present invention the feed cylinders for operating the tool holders are fixed on a slide slidably mounted on the lathe base or frame and are interconnected to the quill in the tailstock by connectors so arranged that movement of the quill is accompanied by movement of the feed cylinder, half the length of movement of the quill. Thus, if the quill of the tailstock and the feed cylinders are in a certain position for turning a certain size axle or like workpiece to be turned, and then an axle two inches shorter is substituted, the quill must be moved two inches for the axle to be gripped between the spindle and quill. The connected feed cylinders however are moved only one inch so as to be centered relative to the median line on the axle. In accordance with the present invention, therefore, the quill and connected feed cylinders are so interconnected by levers that a two inch movement of the quill will result in a one inch movement of the slide to which the connected feed cylinders are fixed.

Still another object of this invention is to provide in a lathe of the character described a tailstock adapted to be clamped to the frame and screw threaded means for adjusting the position of the tailstock relative to the tail.

Yet a further object of this invention is to provide a strong, compact and durable lathe of the character described which shall be relatively inexpensive to manufacture, which shall be smooth and positive in operation, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention.

Referring now in detail to the drawing, 10 designates a lathe embodying the invention for turning railroad axles 11 or the like pieces of stock. The lathe 10 comprises a base 12, a headstock 13 at one end of the lathe, and a tailstock 14 at the other end of the lathe.

Figure 5:
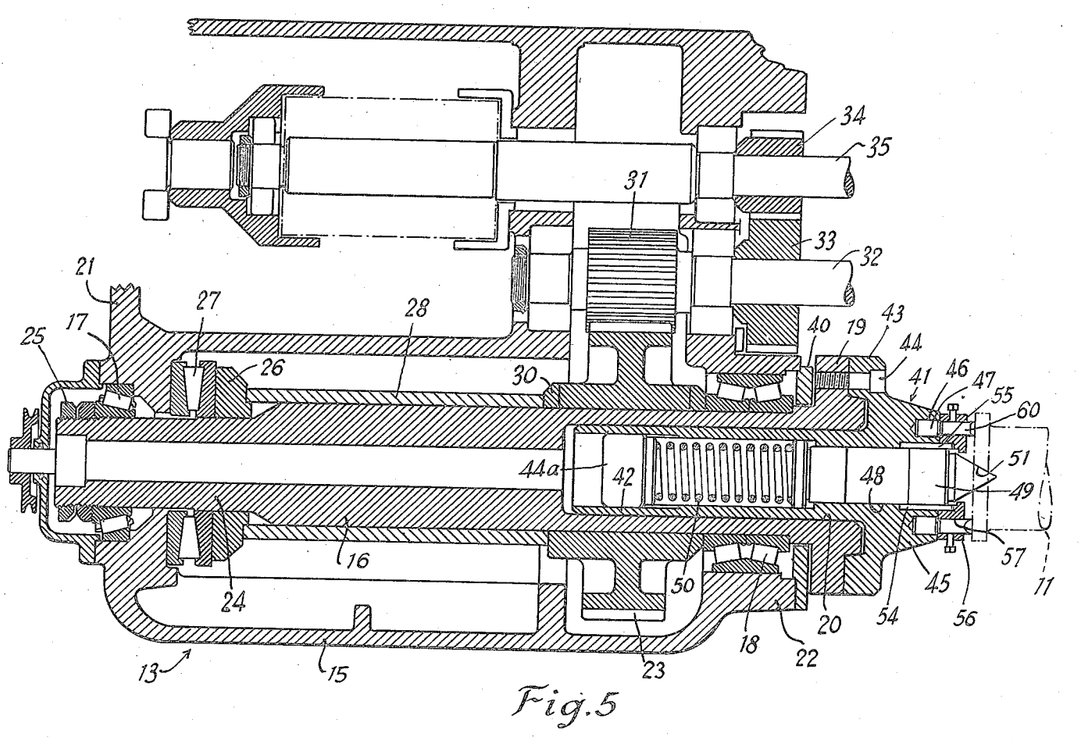
Fig. 5 is a cross-sectional view taken on line 5—5 of Fig. 1.

The headstock 13 comprises a headstock casing 15 on which is mounted a horizontal hollow spindle 16 supported on the rear roller bearing 17 and a front roller bearing 18. The spindle 16 is formed at its front end with an annular outwardly extending flange 19 and with a center counterbore 20. The rear roller bearing 17 is located in the rear wall 21 of the headstock casing, whereas the roller bearing 18 is located within the front wall 22 of said casing. Fixed to the spindle is a gear 23 located within the headstock casing. The spindle 16 is formed with a reduced rear end portion 24 provided with a take-up nut 25 at its rear end. On the reduced end portion 24 of the spindle is a collar 26. Interposed between the collar 26 and the rear wall 21 is a thrust roller bearing 27. Interposed between the collar 26 and gear 23 is a thrust sleeve 28 disposed about the spindle 16. Sleeve 26 is keyed to gear 23 by a key 30. It will now be understood that thrust on the spindle to the left looking at Fig. 5 will be taken up by the thrust bearing 27. Gear 23 meshes with a gear 31 on the shaft 32 journalled in the headstock casing. On shaft 32 is a gear 33 meshing with a gear 34 on a shaft 35 likewise meshing in the headstock casing. The shafts 35 and 32 are parallel to the spindle. The shaft 35 may be driven in any suitable manner by means of a drive belt 36. Attached to the front wall 22 of the headstock casing is a plate 40 to enclose the roller bearing 18.

Mounted on the front end of the spindle is a nose 41. Nose 41 is formed with a sleeve portion 42 disposed within opening 20. It is formed with an outwardly extending flange 43 attached, by screws 44, to flange 19.

Screwed within the rear end of sleeve 42 is a nut 44a. At the forward end of the nose 41 is a head 45 provided with a plurality of annularly arranged spaced openings 46 extending to the front end of said head. Within each opening 46 is a hardened pin 47. Said nose 41 is formed at its forward end with a through opening 48 in which is inserted a line center 49. Interposed between the center 49 and the nut 44 is a coil compression spring 50. Center 49 is adapted to engage a center hole 51 in one end of the axle 11. The head 45 is formed internally with an annular recess 54 receiving a bushing 55 extending forwardly beyond said head.

Contacting the nose 41 is a ram ring 56 surrounding the center 49. The ring 56 is formed with a plurality of annularly spaced through openings 57 in each of which is a spur or depressing button 60. Each spur or button 60 contacts one of the hardened pins 47. The buttons 60 are adapted to dig into one end of the axle. It will now be understood that when the spindle is driven the axle will be rotated due to engagement of the spurs 60 with said axle. The center 49 is spring loaded and pressed into the center opening of the axle.

Figure 4:
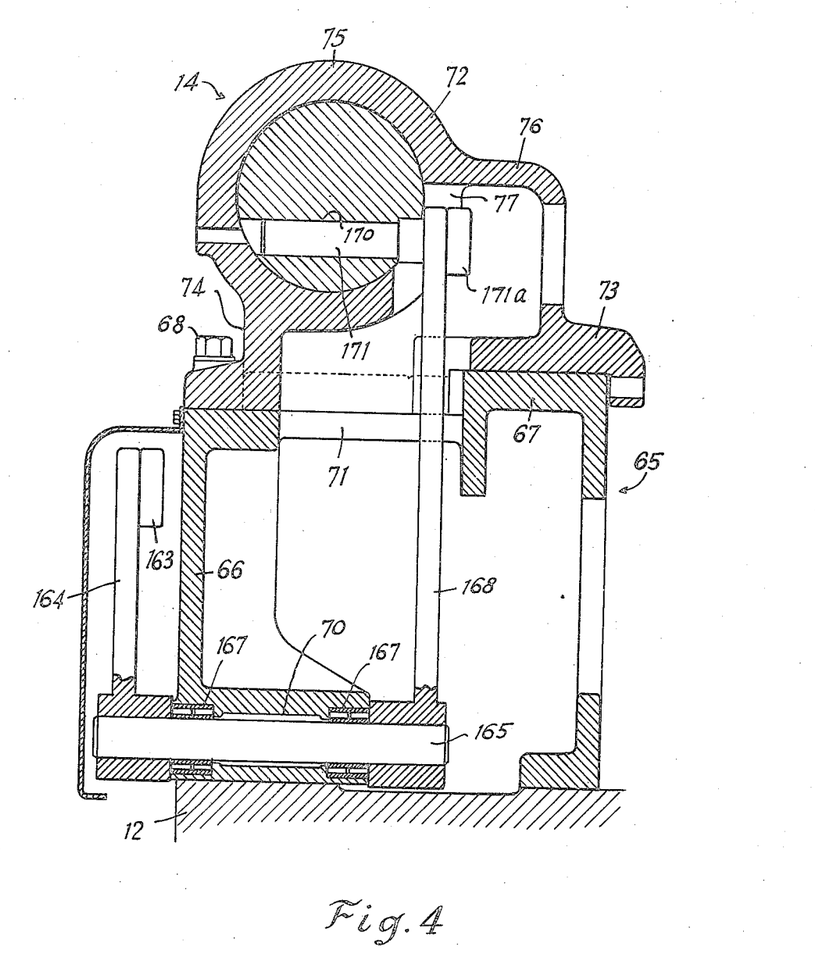
Fig. 4 is a cross-sectional view taken on line 4—4 of Fig. 1.

Looking now at Fig. 4 of the drawing, there is shown therein the base 12 of the lathe. On the base 12 is a frame 65 having a front wall 66 and a stepped top wall 67. The tailstock 14 is adjustably mounted on the top wall 67 for longitudinal sliding movement, and may be bolted thereto in adjusted position by means of screws 68 or in any other suitable manner. The frame 65 is formed with a horizontal through opening 70 at its lower end for the purpose hereinafter appearing. In the top wall 67 is a through opening 71.

The tailstock 14 comprises a tailstock housing 72. The housing 72 comprises a base 73 contacting the top wall 67. Extending upwardly from the base is a front wall 74 extending to a cylindrical horizontal wall 75. The cylindrical wall 75 is connected to the base by means of a rear web 76. The cylindrical wall 75 is open at opposite ends.

It is also formed with an intermediate cutout 77 for the purpose hereinafter appearing. Attached to the rear end of housing 75 is a cover 78 formed with a pair of passages 79 and 80. Slidably mounted in the housing 75 is a cylinder 81 formed with an intermediate transverse wall 82 and with cylindrical walls 83 and 84 extending in opposite directions relative to said transverse wall. Attached to the rear end of the cylindrical wall 83 is a cap or head 85 formed with a central through opening 86. Fixed to the head or cover 78 is a central, forwardly extending shaft or piston rod 87. Attached to the forward end of shaft 87 is a piston 88 on which the cylinder 83 is slidable. Shaft 87 passes through said central opening 86 in the head 85. Said shaft is formed with a longitudinal passage 89 communicating with opening 79 and terminating in an opening 91 which leads to the interior of cylinder 83, and between piston 88 and cap 85. Said shaft 87 is formed with another longitudinal through passage 93 communicating with opening 80 and leading to the rear end of said shaft thereby communicating with the interior of cylinder 83 between piston 88 and partitions 82.

Figure 1:
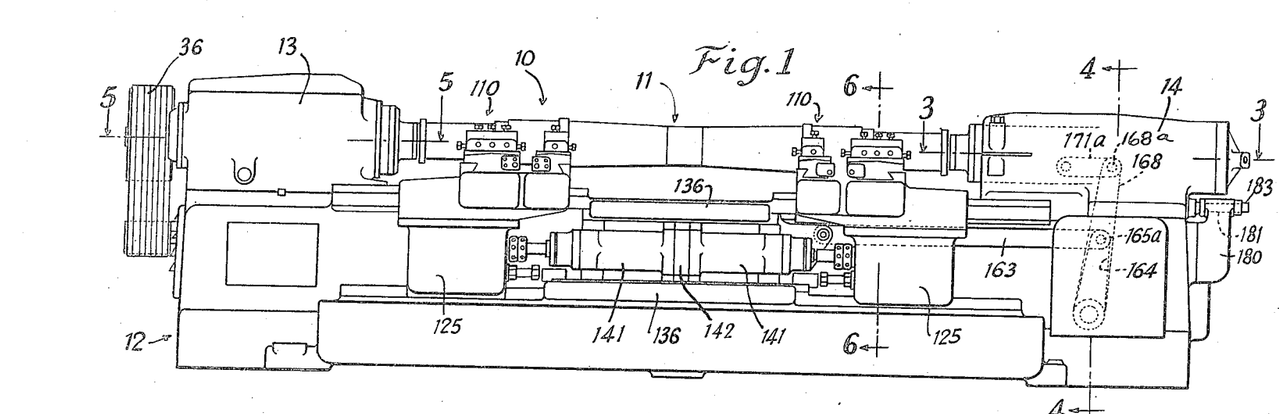
Fig. 1 is a front elevational view of a lathe embodying the invention.
Figure 2:
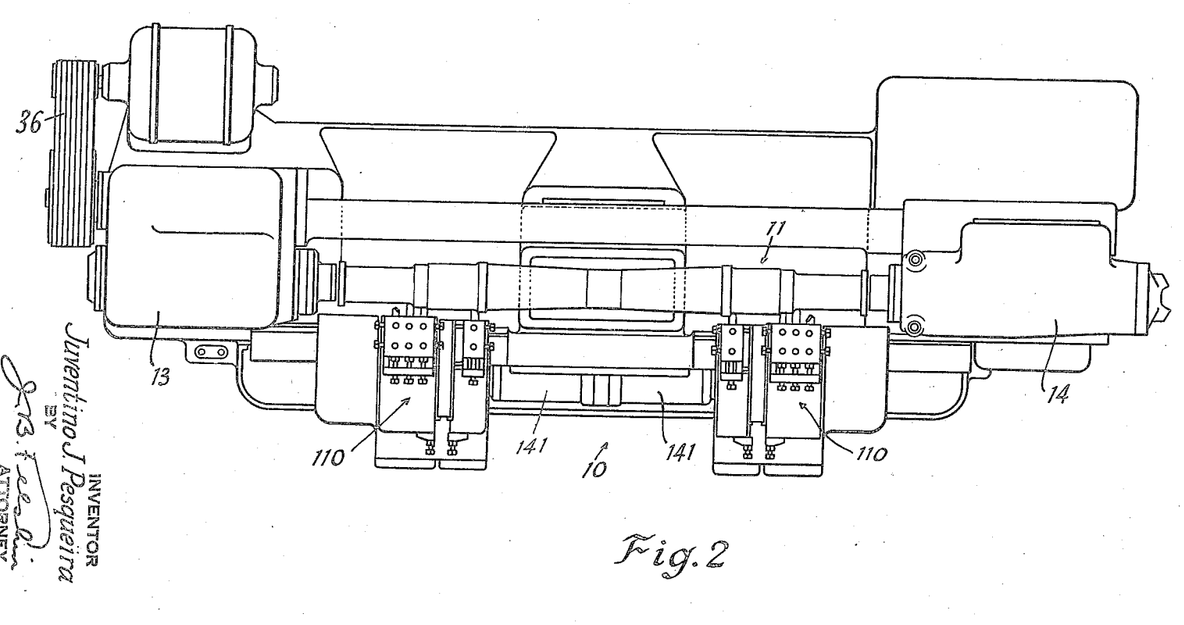
Fig. 2 is a top plan thereof.
Figure 3:
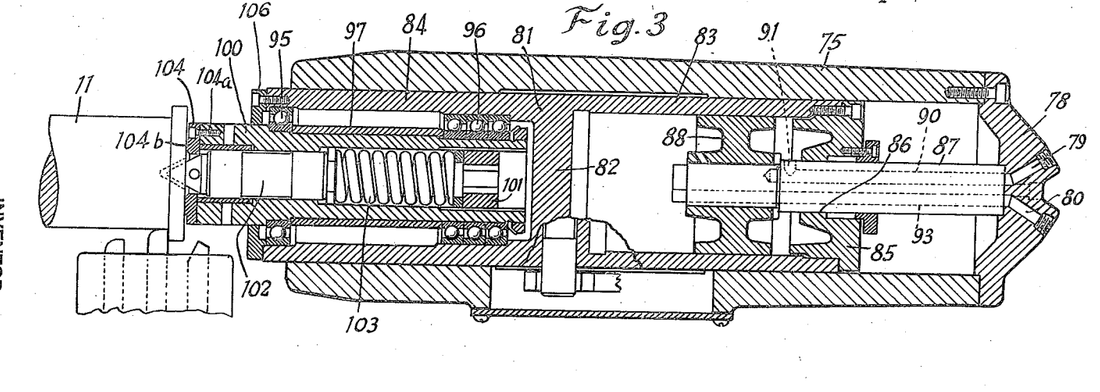
Fig. 3 is an enlarged cross-sectional view through line 3—3 of Fig. 1.

It will now be understood that when hydraulic medium is fed under pressure to passage 79, cylinder 81 will be retracted or moved to the right looking at Fig. 3 of the drawing. When the hydraulic medium is fed to opening 80 under pressure, cylinder 81 will move forwardly to the left, looking at Fig. 3 of the drawing.

Within cylinder 84 are spaced ball bearings 95 and 96 separated by a spacing sleeve 97. Rotatably and non-sliding mounted in the bearings is a quill 100. The quill 100 passes through the sleeve 97. Said quill 100 is in the form of a tube or sleeve. Screwed into the rear end thereof is a nut 101. Rotatably mounted in the forward end of said quill is a center 102. Interposed between nut 101 and center 102 is a coil compression spring 103. The compression spring 103 presses the center 102 into the center opening of the axle or workpiece 11. Attached to the forward end of the quill 100 is a ram 104 adapted to frictionally contact the adjacent end of the axle. It will now be understood that while the headstock spindle rotates the axle, the quill will rotate with the axle. Attached to the forward end of cylinder 84 is a ring 106 surrounding the quill. It will now be understood that when oil is fed through opening 80, cylinder 81 will move to the left to cause the ram 104 to move into contact with the axle. The ram 104 is attached to quill 100 by means of screws 104a or like fastening means and is provided at its front edge with surfaces 104b for frictionally gripping the axle.

Means is provided for turning the axle automatically and symmetrically on both sides of a median line through the axle. The arrangement is such that the axle is turned from the outer ends inwardly. To this end there is provided a pair of similar symmetrically disposed tool holders 110. The tool holders are similar and symmetrically disposed to one another so that only one of them need be described.

Each tool holder comprises a carriage 111 slidably mounted on the longitudinal bed 112 of the lathe. The bed 112 may have longitudinally inclined surfaces 113 and a horizontal undersurface 114. The carriage 111 may be provided with surfaces contacting surfaces 113. Attached to the underside of carriage 111 is a horizontal guide bar 115 contacting surface 114. Slidably mounted on carriage 111 for sliding movement in a direction toward and away from the axle 11 are slides 118 each provided with a tool post 119 carrying the turning tools 119a.

Figure 6:
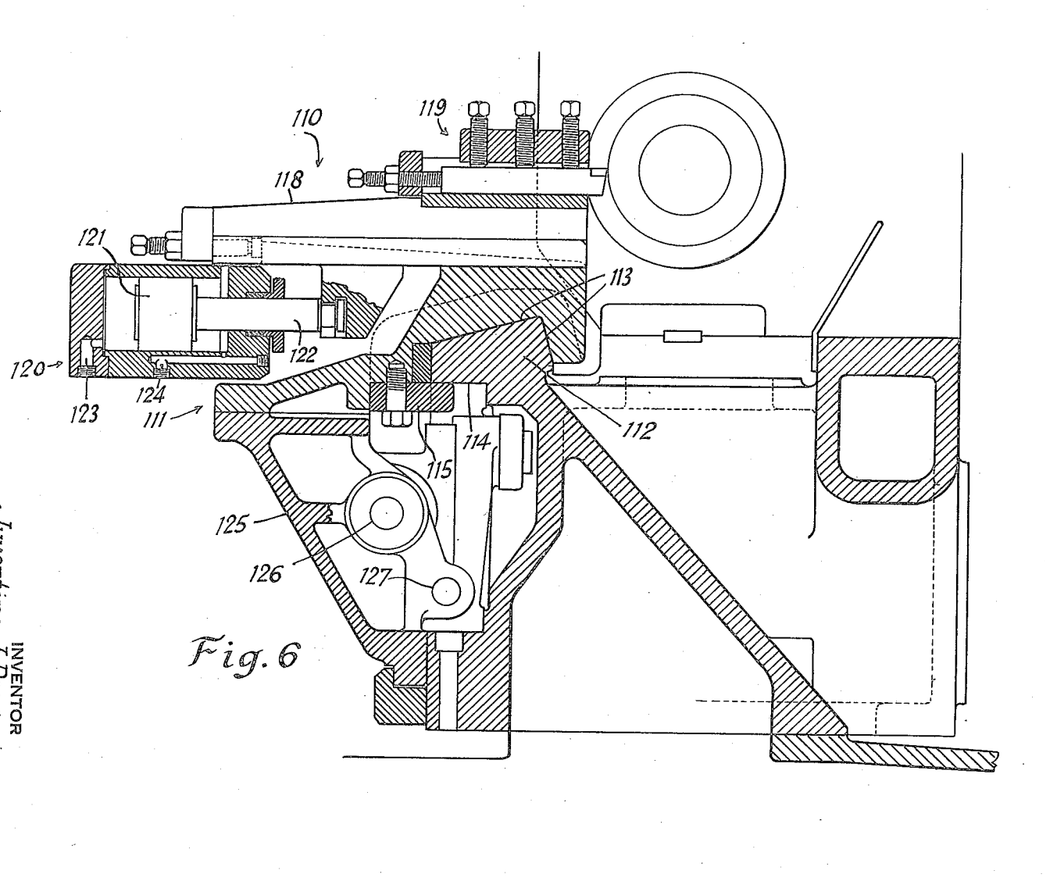
Fig. 6 is a cross-sectional view taken on line 6—6 of Fig. 1.

Hydraulic means may be provided for moving the slides 118. To this end there is mounted on carriage 111 a hydraulic cylinder 120 provided with a piston 121 connected by piston rod 122 with slide 118 as shown in Fig. 6 of the drawing. The cylinder 120 may be provided with opening 123 and 124 at its ends to permit hydraulic medium under pressure to be fed to opposite sides of piston 121.

Figure 7:
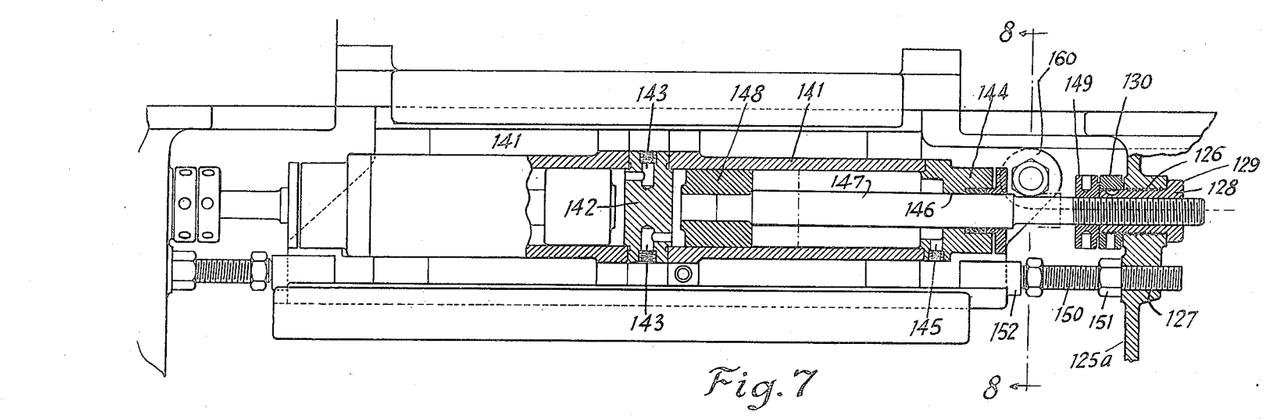
Fig. 7 is a front elevational view of the feed cylinders with parts broken away and in cross-section.
Figure 8:
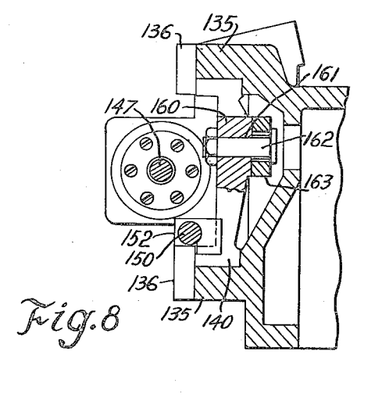
Fig. 8 is a cross-sectional view taken on line 8—8 of Fig. 7 parts in cross-section and rotated 90°.

Attached to carriage 111 and depending therefrom is an apron 125 provided with an inner end wall 125a formed with a longitudinal through opening 126. (See Fig. 7.) Said wall 125a is also formed with a screw threaded opening 127 parallel to opening 126. Extending through opening 126 is a sleeve 128 screw threaded externally and internally. Sleeve 128 is formed with a flange 129 on the inside of the apron contacting wall 125a. Screwed to the opposite end of sleeve 128 is a nut 130.

Means is provided to move the carriages 111 toward and away from each other. To this end, the frame of the lathe is formed at the front thereof and between said carriages, with a pair of horizontal longitudinally extending guide flanges 135. Attached to the front edges of said guide flanges are guide bars 136 overlapping the space between said flanges. Slidably mounted on the frame and between the flanges 135 is a slide 140 the upper and lower edges whereof contact said flanges. The bars 136 contact the front of slide 140 adjacent its upper and lower edges. As will be seen hereinafter, slide 140 moves on its guide for the purpose of adjustment. Fixed to the slide 140 are a pair of similar, symmetrically disposed connected cylinders 141. Between the cylinders 141 is a common dividing wall 142, provided with a pair of passages 143 communicating with the interior of said cylinders respectively. At the outer end of each cylinder is a cap 144 provided with a central opening 145 communicating with the inside of the cylinder. Each cap 144 is formed with an axial through opening 146. Extending through the opening 146 is a piston rod 147 carrying at its inner end a piston 148. The outer end of each piston rod 147 is screw threaded and screwed to collar 128. Screwed to each piston rod is a nut 149 adapted to contact the collar 128. The apron may thus be adjusted relative to the piston rod by properly manipulating the collar 128 and the nut 149.

It will now be understood that when hydraulic medium under pressure is fed through openings 143, the pistons 148 will move in opposite directions for moving the tool holders away from each other. When hydraulic medium under pressure enters openings 145, the tool holders will move toward each other. Movement of the tool holders inwardly toward each other may be limited by means of a stop screw 150 screwed into each opening 126. A lock nut 151 on the stop screw contacts wall 125a of the apron. At the ends of slide 140 are stop lugs 152 adapted to be contacted by the stop screws. As the tool holders move inwardly the stop screws 150 will contact the lugs 152 to limit inward movement.

Means is provided to simultaneously adjust the slide 140 and quill 100, so arranged that as the quill is moved into engagement with an axle, slide 140 will be automatically centered relative to the axle or other work pieces 11 to be turned on the lathe. Thus, for example, if an axle 11 is replaced by another axle which is two inches shorter, that is one inch shorter at each end, the quill must move two inches to contact the new axle, whereas the center of the slide or partition wall 142 between cylinders 141 must be moved one inch so as to be on the median line relative to the shorter axle. To this end slide 140 is provided at one end with an ear 160 formed with an opening 161. In said opening is a bolt or pin 162. Connected to said bolt 162 is one end of a horizontal link 163. Link 163 is connected to the upper end of an arm 164. Arm 164 is fixed to a horizontal shaft 165 journalled in bearings 167 in the opening 70 of frame casing 65. Shaft 165 passes through a pair of spaced bearings 167 of portion 70. Attached to the rear end thereof is an upwardly extending arm 168. The cylinder 81 is formed with a horizontal through opening 170. Extending into said opening 170 is a pin 171. At the upper end of arm 168 is a pin 168a connected to pin 171 by means of a horizontal link 171a. The height of lever 168 from the axis of shaft 165 to the axis of pin 168a is twice the height of lever arm 164 from the axis of shaft 165 to the axis of pin 165a which connects the link 163 with said arm. It will now be understood that when the cylinder 81 is moved to the left it will rotate arm 168 which in turn will rotate shaft 165 and hence arm 164. Such movement will move the link 163 and hence the slice 140 to the left. It will also be understood that movement of the cylinder 81 will be accompanied by movement of the slide half the length of movement of said cylinder. With such construction the connected cylinders will move to a median line relative to the axle as the quill is moved to proper position to engage axles of various lengths.

Means is being provided to adjust the position of the tailstock 14 relative to its support. To this end the frame is provided with a bracket 180 formed with a longitudinal screw threaded opening 181. Screwed thereto is a screw 183, the forward end of which engages the tailstock. Rotation of screw 183 by means of any suitable handle will move the tailstock. The tailstock may be bolted to its supporting frame in adjusted position by the screws or bolts 68.

It will be understood that any suitable means other than the hydraulic means disclosed above, may be employed for moving the tool holders in opposite directions, as for example screws or the like devices.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. In a lathe, a headstock, driving means on the headstock adapted to engage one end of a work piece, a tailstock, a rotary quill on the tailstock adapted to engage the opposite end of the work piece, a pair of tool holders, a slide mounted on the lathe, between said tool holders, a pair of symmetrical cylinders on said slide, pistons in said cylinders connected to said tool holders, means to support said slide for movement lengthwise of the lathe, and means interconnecting said slide to said quill to cause said slide to move half the length of movement of said quill upon moving the latter, and means to move said quill.

2. In a lathe, a frame, a headstock on the frame, a spindle in the headstock, means on the spindle to engage one end of the work piece, a tailstock on the frame, a quill rotatably mounted in the tailstock and adapted to engage the opposite end of the work piece, a pair of tool holders slidably mounted on the frame for movement toward and away from each other, a member mounted on the frame for movement longitudinally of the frame, means on said member to simultaneously move said tool holders toward each other and away from each other, and means interconnecting the quill and member for simultaneous movement.

3. In a lathe, a frame, a headstock on the frame, a spindle in the headstock, means on the spindle to engage one end of the work piece, a tailstock on the frame, a quill rotatably mounted in the tailstock and adapted to engage the opposite end of the work piece, a pair of tool holders slidably mounted on the frame for movement toward and away from each other, a member mounted on the frame for movement longitudinally of the frame, means on said member to simultaneously move said tool holders toward each other and away from each other, and means interconnecting the quill and member for simultaneous movement, said last means including means, upon movement of the quill a predetermined longitudinal distance, to cause movement of said member by substantially half said distance.

4. In combination, a lathe comprising a base, a headstock on the base, driven means on the headstock to rotate a work piece, a tailstock on the base, means rotatably and slidably mounted in the tailstock to engage said work piece, a pair of tool holders, a member slidably mounted on the base and disposed between said tool holders, means on said member to simultaneously move said tool holders in opposite directions, a shaft rotatably mounted in said base, an arm fixed to said shaft, means to connect said arm with said member, a second arm fixed to said shaft, and means to connect the second arm to said work piece engaging means.

5. In combination, a lathe comprising a base, a headstock on the base, driven means on the headstock to rotate a work piece, a tailstock on the base, means rotatably and slidably mounted in the tailstock to engage said work piece, a pair of tool holders, a member slidably mounted on the base and disposed between said tool holders, means on said member to simultaneously move said tool holders in opposite directions, a shaft rotatably mounted in said base, an arm fixed to said shaft, means to connect said arm with said member, a second arm fixed to said shaft, and means to connect the second arm to said work piece engaging means, said second arm being twice the length of the first arm.

6. A lathe comprising a support, a tailstock on said support, and a member slidably mounted in said tailstock, a slide slidably mounted on said support for movement lengthwise of the support and parallel to the axis of said tailstock, a pair of oppositely disposed cylinders fixed to said slide, a piston disposed within each of said cylinders, a tool holder attached to each piston, a plurality of parallel tools on each tool holder, disposed perpendicular to said cylinder and means connecting said slidable member to said slide whereby movement of said slidable member will control the movement of said slide.

7. A lathe comprising a support, a slide slidably mounted on said support for movement lengthwise of the support, a pair of oppositely disposed cylinders fixed to said slide, a piston disposed within each of said cylinders and a tool holder attached to each piston, and means to adjust the length of the connection between each tool holder and its piston, slidable means to engage and support one end of a work piece in said lathe, an arm oscillatably mounted on said frame and connected to said work engaging means, a second arm fixed to oscillate with said first arm, means to connect the second arm to said slide, said first arm being twice the length of the second arm, whereby movement of said slidable means a predetermined distance will cause said slide to move one-half of said distance.

8. A lathe comprising a support, a slide slidably mounted on said support for movement lengthwise of the support, a pair of oppositely disposed cylinders fixed to said slide, a piston disposed within each of said cylinders and a tool holder attached to each piston, and means to adjust the length of the connection between each tool holder and its piston, slidable means to engage and support one end of a work piece in said lathe, an arm oscillatably mounted on said support and connected to said work engaging means, a second arm fixed to oscillate with said first arm, means to connect the second arm to said slide, said first arm being twice the length of the second arm, said arms being oscillatable about a horizontal axis transverse of the direction of movement of said slide, and said arms extending upwardly, whereby movement of said slidable means will control the movement of said slide.

9. In a lathe, a tailstock, a cylinder within said tailstock, means to slidably move said cylinder, a quill rotatably and non-slidably mounted in said cylinder, a tool holder, a slide, means on the slide to move the tool holder, a shaft rotatably mounted on the lathe, an arm fixed to the shaft, a link connecting said arm to the cylinder in the tailstock, a second arm on said shaft, and a link connecting the second arm with said slide, whereby slidable movement of said cylinder will control the movement of said slide in accordance with the relative lengths of said first and second arms.

10. In a lathe, a tailstock, a cylinder within said tailstock, means to slidably move said cylinder, a quill rotatably and non-slidably mounted on said cylinder, a tool holder, a slide, means on the slide to move the tool holder, a shaft rotatably mounted on the lathe, an arm fixed to the shaft, a link connecting said arm to the cylinder in the tailstock, a second arm on said shaft, and a link connecting the second arm with said slide, said first arm being twice the length of the second arm, whereby movement of said cylinder a predetermined distance will cause said slide to move one-half said distance.

11. In a lathe, a tailstock, a cylinder within said tailstock, means to slidably move said cylinder, a quill rotatably and non-slidably mounted on said cylinder, a tool holder, a slide, means on the slide to move the tool holder, a shaft rotatably mounted on the lathe, an arm fixed to the shaft, a link connecting said arm to the cylinder in the tailstock, a second arm on said shaft, and a link connecting the second arm with said slide, said first arm being twice the length of the second arm, said shaft being horizontal and disposed transversely of the axis of said cylinder, and said arms extending upwardly, and said links being disposed parallel to the axis of said cylinder, whereby movement of said cylinder a predetermined distance will cause said slide to move one-half said distance.

JUVENTINO JOSE PESQUEIRA.

REFERENCES CITED

The following references are of record in the file of this patent:

UNITED STATES PATENTS

| Number | Name | Date |
|---|---|---|
| 400,882 | Tower | Apr. 2, 1889 |
| 1,334,335 | Warren | Mar. 23, 1920 |
| 1,424,754 | Cullen | Aug. 8, 1922 |
| 1,825,722 | Forward | Oct. 6, 1931 |
| 1,834,831 | Drummond | Dec. 1, 1931 |
| 1,883,093 | Taylor | Oct. 18, 1932 |
| 2,117,960 | Indge | May 17, 1938 |
| 2,144,490 | Granberg | Jan. 17, 1939 |
| 2,338,125 | May | Jan. 4, 1944 |
| 2,389,746 | Sparks | Nov. 27, 1945 |